(12) United States Patent
Fawcett

(10) Patent No.: US 11,157,323 B2
(45) Date of Patent: Oct. 26, 2021

(54) MULTIPLE METRIC BASED LOAD PREDICTION AND RESOURCE ALLOCATION IN AN ACTIVE STREAM PROCESSING JOB

(71) Applicant: International Business Machines Corporation, Armonk, NY (US)

(72) Inventor: Bradley William Fawcett, Byron, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 16/244,611

(22) Filed: Jan. 10, 2019

(65) Prior Publication Data
US 2020/0225989 A1    Jul. 16, 2020

(51) Int. Cl.
G06F 9/50      (2006.01)
G06F 9/48      (2006.01)
H04L 29/08     (2006.01)
G06F 11/34     (2006.01)
G06F 16/2455   (2019.01)

(52) U.S. Cl.
CPC ............ *G06F 9/505* (2013.01); *G06F 9/4856* (2013.01); *G06F 9/5077* (2013.01); *G06F 9/5083* (2013.01); *G06F 11/3433* (2013.01); *G06F 16/24568* (2019.01); *H04L 67/34* (2013.01);
(Continued)

(58) Field of Classification Search
CPC ........... G06F 11/3433; G06F 16/24568; G06F 2209/5019; G06F 2209/5022; G06F 2209/508; G06F 9/4856; G06F 9/505; G06F 9/5077; G06F 9/5083; G06F 9/5088; H04L 67/1025; H04L 67/34
See application file for complete search history.

(56) References Cited

U.S. PATENT DOCUMENTS 9,529,634 B1 *  12/2016  Hsu ............................ G06F 9/46
9,535,763 B1 *   1/2017  Cook .................... G06F 9/5005
(Continued)

OTHER PUBLICATIONS

Beloglazov et al., "Managing Overloaded Hosts for Dynamic Consolidation of Virtual Machines in Cloud Data Centers under Quality of Service Constraints", Jul. 2013, IEEE.

*Primary Examiner* — Jorge A Chu Joy-Davila
(74) *Attorney, Agent, or Firm* — Garg Law Firm, PLLC; Rakesh Garg; William Hartwell

(57) ABSTRACT

According to a request to modify a configuration of the portion, a portion of a currently executing compiled streams application is modified by computing a current composite load on a resource used by an executing processing element. As a part of modifying the configuration, within the portion according to the request, a composite load on a first candidate resource is predicted. Based on the predicted composite load, a configuration modification is generated based on a predicted throughput improvement resulting from migrating the processing element to the first candidate resource. The processing element is migrated, resulting in a throughput improvement, to a target resource selected from a set of candidate resources, a resource in the set of candidate resources categorized based on a predicted second composite load resulting from migrating the processing element to the second candidate resource according to the configuration modification.

21 Claims, 8 Drawing Sheets

(52) U.S. Cl.
    CPC .................. *G06F 2209/508* (2013.01); *G06F 2209/5019* (2013.01); *G06F 2209/5022* (2013.01)

(56) References Cited

U.S. PATENT DOCUMENTS

| | | | |
|---|---|---|---|
| 10,684,840 B1* | 6/2020 | Hussain | H04L 67/10 |
| 2013/0097321 A1* | 4/2013 | Tumbde | G06F 11/3433 |
| | | | 709/226 |
| 2013/0346572 A1* | 12/2013 | Jain | G06F 9/5088 |
| | | | 709/223 |
| 2015/0039764 A1* | 2/2015 | Beloglazov | H04L 47/70 |
| | | | 709/226 |
| 2015/0207749 A1* | 7/2015 | Cao | H04L 65/4069 |
| | | | 709/226 |
| 2015/0271045 A1* | 9/2015 | Jiang | H04L 41/069 |
| | | | 370/252 |
| 2017/0083199 A1 | 3/2017 | Barsness et al. | |
| 2017/0220392 A1* | 8/2017 | Cropper | G06F 9/5011 |
| 2017/0315836 A1* | 11/2017 | Langer | G06F 11/301 |
| 2018/0024860 A1* | 1/2018 | Balle | G06F 13/4068 |
| | | | 718/104 |
| 2018/0103081 A1 | 4/2018 | Fawcett | |

* cited by examiner

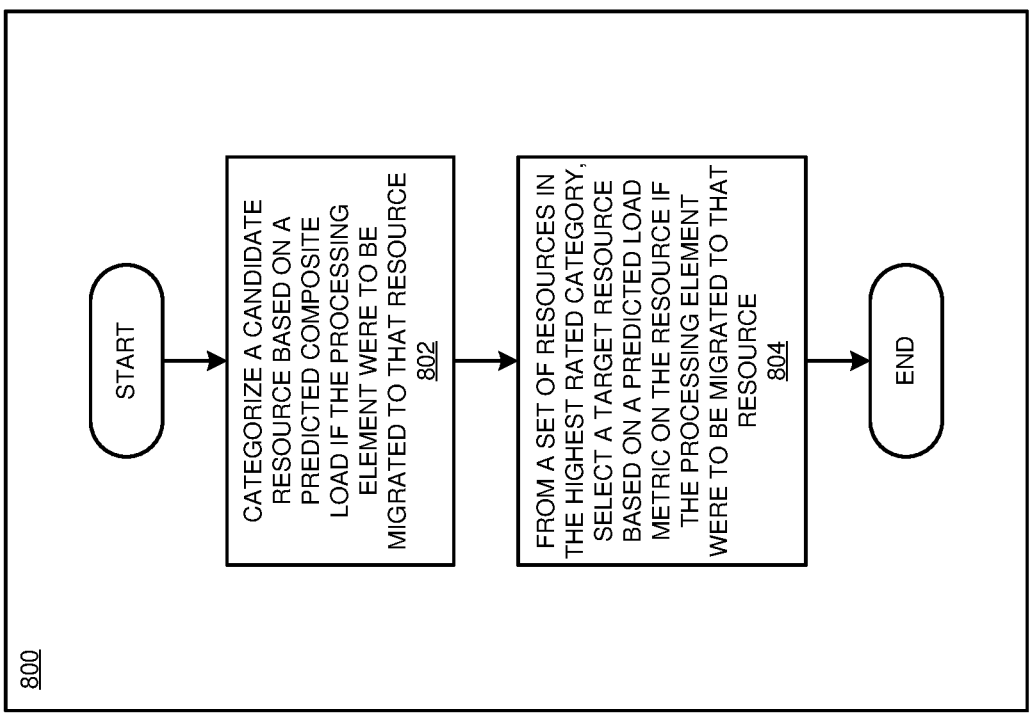

MULTIPLE METRIC BASED LOAD PREDICTION AND RESOURCE ALLOCATION IN AN ACTIVE STREAM PROCESSING JOB

TECHNICAL FIELD

The present invention relates generally to a method, system, and computer program product for resource reassignment in a stream processing environment. More particularly, the present invention relates to a method, system, and computer program product for multiple metric based load prediction and resource allocation in an active stream processing job.

BACKGROUND

Stream computing is a relatively new paradigm. Traditional data processing typically involves queries run against static data, for example data held in a database or other data repository, providing a static query result set for further analysis. Stream computing, in contrast, performs a query on a continuous stream of data and produces a continuous stream of query results. Sensors, cameras, news feeds, and stock tickers are just a few examples of sources of continuous streams of data amenable to processing in a stream computing environment. As with traditional static data, streams of data may be numeric, text, audio, video, or any other type of data.

As used herein, a tuple is an individual piece of data in a stream. The data in a tuple can be structured or unstructured. Typically, the data in a tuple represents a state at a specific point in time. For example, data in a tuple might represent a temperature reading or a price of a publicly traded stock at a particular second. A data stream, or stream, is a sequence of tuples. For example, a data stream might represent a sequence of once-per-minute temperature readings or a sequence of stock prices through a trading day.

As used herein, an operator performs an action on tuples in a data stream. Operators are the fundamental building blocks of stream processing applications.

A stream application is software that specifies a defined collection of at least one operator and at least one data stream processed by an operator. Thus, a stream application defines how operator runtime code should process stream data. A stream application can also be represented as a data flow graph. Each node of the graph represents an operator, and one or more data streams flow between nodes, in a specified direction. Operators may be arranged in series, parallel, or a combination, and have zero or more input streams and zero or more output streams.

A simple example stream application includes three example operators, arranged in series. The first operator, FileSource( ), reads data from a file and submits the data to the output stream of FileSource( ) as individual tuples in a data stream. The second operator, Filter( ), has an input stream connected to the output stream of FileSource( ). Filter( ) receives the data stream from FileSource( ) and outputs a filtered data stream consisting only of tuples that satisfy a condition specified in a parameter of Filter( ). The third operator, FileSink( ), has an input stream connected to the output stream of Filter( ). FileSink( ) receives the data stream from Filter( ) and writes the data stream to a file instead of outputting another data stream.

When an stream application is configured for execution, the operators defined in the application are placed onto one or more individual execution units, also called processing elements (PEs). A PE performs tuple processing for one or more operators, and fusing is the process of placing operators together into a common PE. A PE runs on a host, also called a resource. A host supports execution of one or more PEs, and may be a physical machine, virtual machine, or another computing entity capable of executing a PE.

Hosts within a stream processing environment are often configured differently from each other to support different types and sizes of computing loads. For example, one computing load may be processor-intensive, requiring more processing power than an average load, but require less storage area and networking bandwidth than an average load. Another computing load may integrate information from a number of sources, thus requiring greater networking bandwidth than an average load, but not be processor intensive. A host is configurable with one or more processors, each having a particular speed. A host is also configurable with memory and storage, each having a particular size, and a networking interface having a particular capacity.

Configuring a stream application for execution includes specifying operator placement within PEs and resource usage for PEs. A configuration adapted to the application, quantity and type of data to be processed, and the environment in which the application executes improves application throughput and performance. Job-appropriate placement of operators into PEs is important for performance. Because PE-internal communication is faster than cross-PE communication, grouping together operators that share a large quantity of data with each other may be more efficient than separating the operators. However, if fewer operators share a PE each operator will have access to a larger share of the PE's execution capability. Thus, configuring a stream application includes specifying which operators should be placed in the same PE, or which operators should not share a PE.

Some operators can also be expected to use more host resources, or more of a particular type or size of host resource. Thus, configuring a stream application to accommodate particular operators includes specifying whether an operator should only execute on a particular host or a host in a particular host pool (a set of resources designated for a particular purpose), as well as specifying which operators should execute on the same host or which operators should not share a host.

Configuring a stream application also includes specifying how operators are distributed among PEs and how PEs are distributed among hosts. For example, for most overall efficiency, one might specify that PEs are to be balanced across resources based on the capacity and current load of the resources. Alternatively, for the most predictable placement, one might specify that PEs are to be balanced only within a particular job, or executing instance of a stream application, without accounting for other jobs that might also be executing in the stream processing environment. As well, one might specify which resources can host which PEs, including that a set of PEs can share a set of resources (e.g. within one host or one host pool), and which PEs cannot share a particular resource or set of resources.

As in traditional data processing, a stream application must be compiled before execution. However, unlike traditional data processing, a compiled stream application also includes operator, PE, and resource configuration information. As well, when a job is submitted for execution, the submitter has the option to modify the compiled configuration information, allowing a particular job to be configured to the environment in which the job is to be run. Then at runtime, a scheduler configures operators and data streams onto PEs, PS onto operators and resources, and the operators begin executing code on the tuples in one or more data streams.

SUMMARY

The illustrative embodiments provide a method, system, and computer program product. An embodiment includes a method that modifies a portion of a currently executing compiled streams application according to a request to modify a configuration of the portion by computing a current composite load on a resource used by an executing processing element. An embodiment predicts, as a part of modifying the configuration, within the portion according to the request, a composite load on a first candidate resource, the predicted composite load including the current composite load. An embodiment generates, based on the predicted composite load, a configuration modification based on a predicted throughput improvement resulting from migrating the processing element to the first candidate resource. An embodiment migrates the processing element to a target resource selected from a set of candidate resources, migration of the processing element to the target resource resulting in a throughput improvement, a resource in the set of candidate resources categorized based on a predicted second composite load resulting from migrating the processing element to the second candidate resource according to the configuration modification.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a flowchart of an example process for multiple metric based load prediction and resource allocation in an active stream processing job in accordance with an illustrative embodiment.

DETAILED DESCRIPTION

Figure 1:
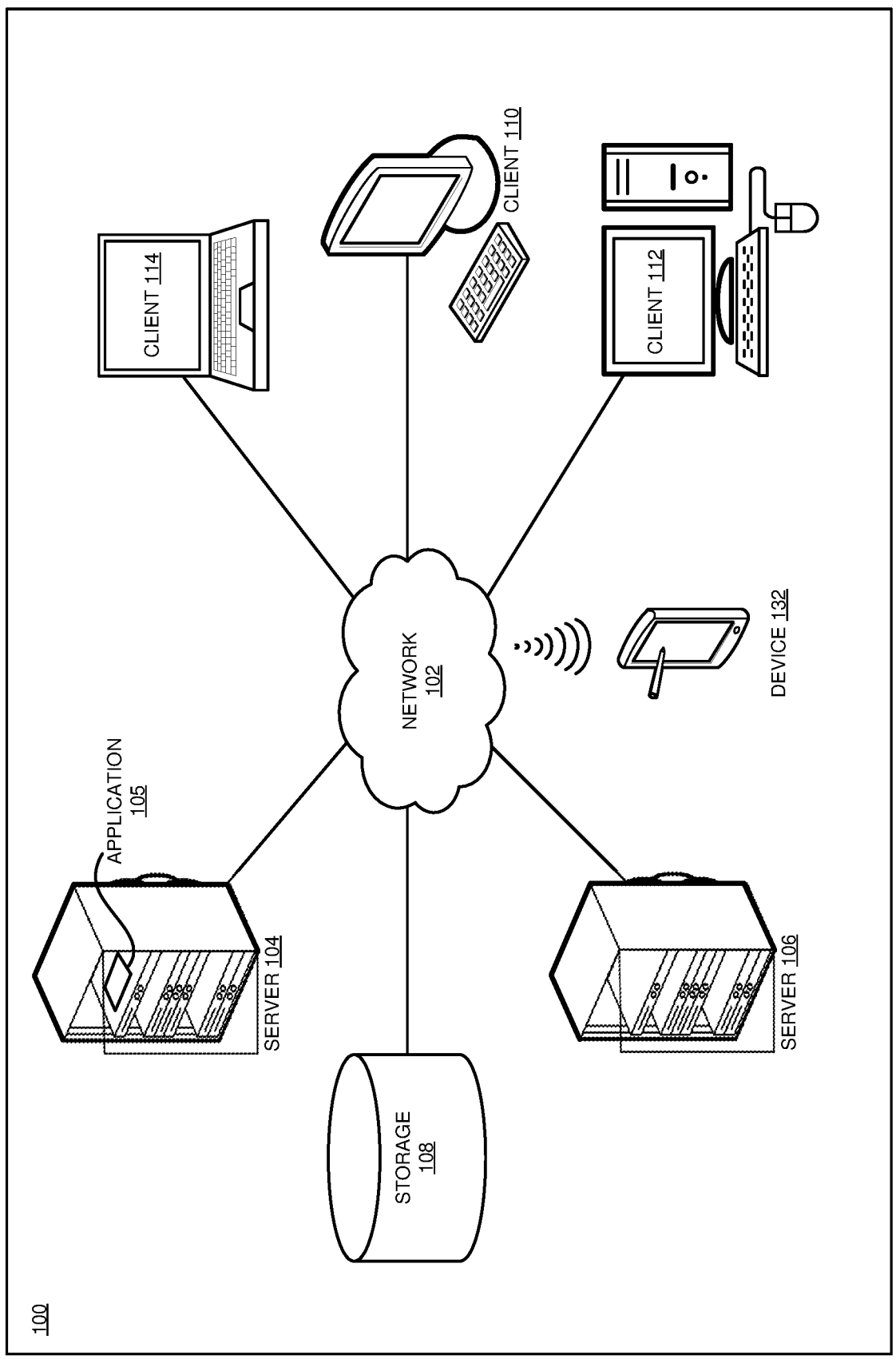
FIG. 1 depicts a block diagram of a network of data processing systems in which illustrative embodiments may be implemented.

The illustrative embodiments recognize that which PEs are assigned to execute on which hosts, or resources, has a significant effect on the performance and efficiency of a stream application. Within a stream application, different operators, grouped into different PEs, process different amounts and types of data. As well, a data stream may vary with time, changing the resource needs of any operators processing the data stream.

The illustrative embodiments recognize that when determining a resource for a PE, one criteria is the current load on each candidate resource. In general, overall performance of the stream processing environment is improved when the candidate resource with the lightest current load is chosen for the PE.

The illustrative embodiments also recognize that the metrics used to determine a load on a candidate host are not matched to the type of load the PE will add to each candidate host. The PE, or the operators executing a job on the PE, may have a requirement for a particular processor usage, memory usage, network bandwidth usage, available file space, or another requirement. For example, a PE might be executing a job with a higher-than-average network bandwidth requirement. For best performance of this particular job, this example PE should be placed on a host with a correspondingly higher-than-average network bandwidth availability. However, typical load metrics measure only processing capacity, or are a composite of different measurements without taking the requirements of a particular PE—such as the higher-than-average network bandwidth requirement of the example—into account.

The illustrative embodiments recognize that the presently available tools or solutions do not address these needs or problems or provide adequate solutions for these needs or problems. The illustrative embodiments used to describe the invention generally address and solve the above-described problems and other problems related to multiple metric based load prediction and resource allocation in an active stream processing job.

An embodiment can be implemented as a software application. The application implementing an embodiment can be configured as a modification of an existing stream processing system, as a separate application that operates in conjunction with an existing stream processing system, a stand-alone application, or some combination thereof.

Particularly, some illustrative embodiments provide a method by which a predicted load on a candidate resource is determined based on a current load of a PE on a resource, a predicted throughput improvement is determined based on migrating the PE to the candidate resource, and the PE is migrated to a target resource selected from a set of candidate resources characterized based on predicted composite loads.

An embodiment receives a load metric from a user. A load metric is a measurement of the current usage level of a resource relative to the resource's total capacity. For example, a load metric of 75 percent means that that the resource is at 75 percent of its total capacity.

One embodiment uses load metrics measuring processor usage, memory usage, network bandwidth usage, and file space usage. Processor usage measures the current usage level of a processor, or group of processors, relative to the processor or group's total capacity. For example, processor usage for a single core processor at a fixed frequency without hardware multithreading or shared caches might be determined by measuring the percentage of time the processor spends doing work (as opposed to being idle). If a single core fixed-frequency 2.0 GHz processor does 1 billion cycles worth of work in a second, the processor is 50% utilized for that second. As another example, processor usage in a multi-core processor might be determined by measuring the number of processor cores that are currently in use divided by the total number of installed processor cores, then converting to a percentage. Similarly, memory usage measures the current usage level of a memory relative to the memory's total capacity. For example, a 4 gigabyte system memory, of which 1 gigabyte is available for use, has a 75% memory usage. Similarly, network bandwidth usage measures the current usage level of a network interface relative to the network interface's total capacity, and file space usage measures the current usage level of a file system relative to the file system's total capacity. Additional load metrics, and different combinations of load metrics, are also possible and contemplated within the scope of the illustrative embodiments.

An embodiment also receives a threshold corresponding to each load metric. In one embodiment, the threshold corresponds to an overloaded setting—if the load metric is above the threshold, the resource is considered overloaded relative to that particular metric. Another embodiment utilizes upper and lower thresholds. If the load metric is above the upper threshold, the resource is considered overloaded relative to that particular metric. If the load metric is below the lower threshold, the resource is considered underloaded relative to that particular metric. If the load metric is between the lower threshold and the upper threshold, the resource is considered neither overloaded nor underloaded—hence medium loaded—relative to that particular metric. To increase granularity in load determination and scheduling, other schemes utilizing correspondingly more thresholds are contemplated within the scope of the illustrative embodiment. One embodiment utilizes five thresholds, creating six loading classifications: very-overloaded, overloaded, slightly-overloaded, slightly-underloaded, underloaded, and very-underloaded.

For example, in an embodiment using two thresholds, an upper processor usage threshold set to 80 percent means that for a particular job running in a particular stream processing environment, when processor usage is above 80 percent applications throughput is no longer acceptable. A lower processor usage threshold set to 40 percent means that for this job, when processor usage is below 40 percent, processor usage no longer affects overall application performance.

Typically, a threshold corresponding to each load metric is set corresponding to characteristics of a particular job. For example, if the performance of one particular job is not greatly affected by the quantity of available memory, the lower and upper memory usage thresholds might be set to 70 and 90 percent respectively. As another example, if the performance of the same job is greatly affected by the amount of available network bandwidth, the lower and upper network bandwidth usage thresholds might be set to 20 and 50 percent respectively. And if the performance of the same job is not affected at all by file system usage, both file system usage thresholds might be set to 100 percent, meaning that there is no file system usage measurement that is considered overloaded.

An embodiment also receives a specification of a PE to be placed onto a resource with available capacity as determined by a received load metric and corresponding threshold. An embodiment determines the current composite load on the resource on which the PE is currently executing. To determine the current composite load, an embodiment measures current usage according to a particular load metric, and classifies current usage against one or more thresholds corresponding to the particular load metric. Thus, for each load metric, usage is classified into overloaded or not (for an embodiment using one threshold), one of overloaded, underloaded, and medium loaded (for an embodiment using two thresholds), or one of a set of finer classifications (for an embodiment using more than two thresholds). Next, the embodiment calculates a current composite load based on the classification of each load metric as follows: if all load metrics have been classified as underloaded, the composite load is also classified as underloaded. If any load metric has been classified as overloaded, the composite load is also classified as overloaded. Otherwise, the composite load is classified as medium loaded.

To determine the current composite load, another embodiment measures current usage according to a particular load metric, and averages the current usage measured for each load metric. To determine the current composite load, another embodiment measures current usage according to a particular load metric, and computes a weighted average of the current usage measured for each load metric. The embodiment is configurable to receive weights with which to compute the weighted average, or to use hard-coded weights. Other methods of determining composite load are also contemplated within the scope of the illustrative embodiment.

An embodiment determines a predicted composite load on a candidate resource to which the PE could be migrated. To determine the predicted composite load, an embodiment measures current usage according to a particular load metric, adds projected PE usage according to the same load metric, and classifies the sum of the usages against one or more thresholds corresponding to the same load metric. For the projected PE usage, an embodiment uses a default value used for any yet-to-be-deployed PE, or a default value used for a yet-to-be-deployed PE of the same type as this PE, or a default value used for a similar PE, where similarity is determined by a measure other than a type classification. Another embodiment uses, for the projected PE usage, a value based on historical information from a prior deployment of this PE, a prior deployment of a PE of the same type as this PE, or a prior deployment a similar PE, where similarity is determined by a measure other than a type classification. Next, the embodiment calculates a predicted composite load based on the classified sum of the usages of each load metric as described herein.

From the predicted composite load for one or more candidate resources, an embodiment evaluates a throughput improvement predicted to result from migrating the PE to a candidate resource. An embodiment evaluates the predicted throughput numerically (e.g. a 5 percent increase in the amount of data the application will be able to process in a time period), using a classification-based measure (e.g. an improvement from one threshold-based load classification to an adjacent classification, or an improvement from one threshold-based load classification to a different classification more than one level removed from the original classification), using a quality measure, or a combination of a numerical evaluation and a quality measure. From the evaluation, an embodiment selects a load strategy for the PE An embodiment, to implement a selected load strategy, categorizes a candidate resource based on the predicted composite load that would be created by migrating the PE to the candidate resource specified in the load strategy. Then, from a set of candidate resources within the highest rated category available, an embodiment selects, as a final candidate resource, the candidate resource having the most capacity as determined by one particular load metric. Selecting from the set of candidate resources within the highest rated category ensures that all candidates have at least a reasonable level of available capacity. Selecting a final candidate resource using the load metric considered most significant for a particular job is likely to lead to the most performance improvement when the PE is moved to that resource. However, another embodiment selects a final candidate resource by considering each available load metric individually, instead of considering only the most significant load metric.

If an additional PE requires migration, an embodiment repeats the load calculation, classification, and candidate resource selection process. When assessing a candidate resource for a second PE, the embodiment includes in the current load the predicted load for any PE that is already scheduled to be migrated to that resource, to ensure that a candidate resource is not overloaded with newly-migrated PEs.

Once a final candidate resource has been selected for a PE that requires migration within a resource allocation session, the PE is migrated to the selected resource. An embodiment performs the migration using any method supported by the stream processing environment in which the embodiment operates. Once the PE has been placed on the new resource, an embodiment activates the PE for tuple processing.

The manner of multiple metric based load prediction and resource allocation in an active stream processing job described herein is unavailable in the presently available methods in the technological field of endeavor pertaining to stream processing. A method of an embodiment described herein, when implemented to execute on a device or data processing system, comprises substantial advancement of the functionality of that device or data processing system in determining a predicted load on a candidate resource based on a current load of a PE on a resource, determining a predicted throughput improvement based on migrating the PE to the candidate resource, and migrating the PE to a target resource selected from a set of candidate resources characterized based on predicted composite loads.

The illustrative embodiments are described with respect to certain types of operators, data streams, stream processing environments, stream processing applications, jobs, resources, hosts, processing elements, specifications, constraints, configurations, load metrics, usages, capacities, classifications, rankings, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
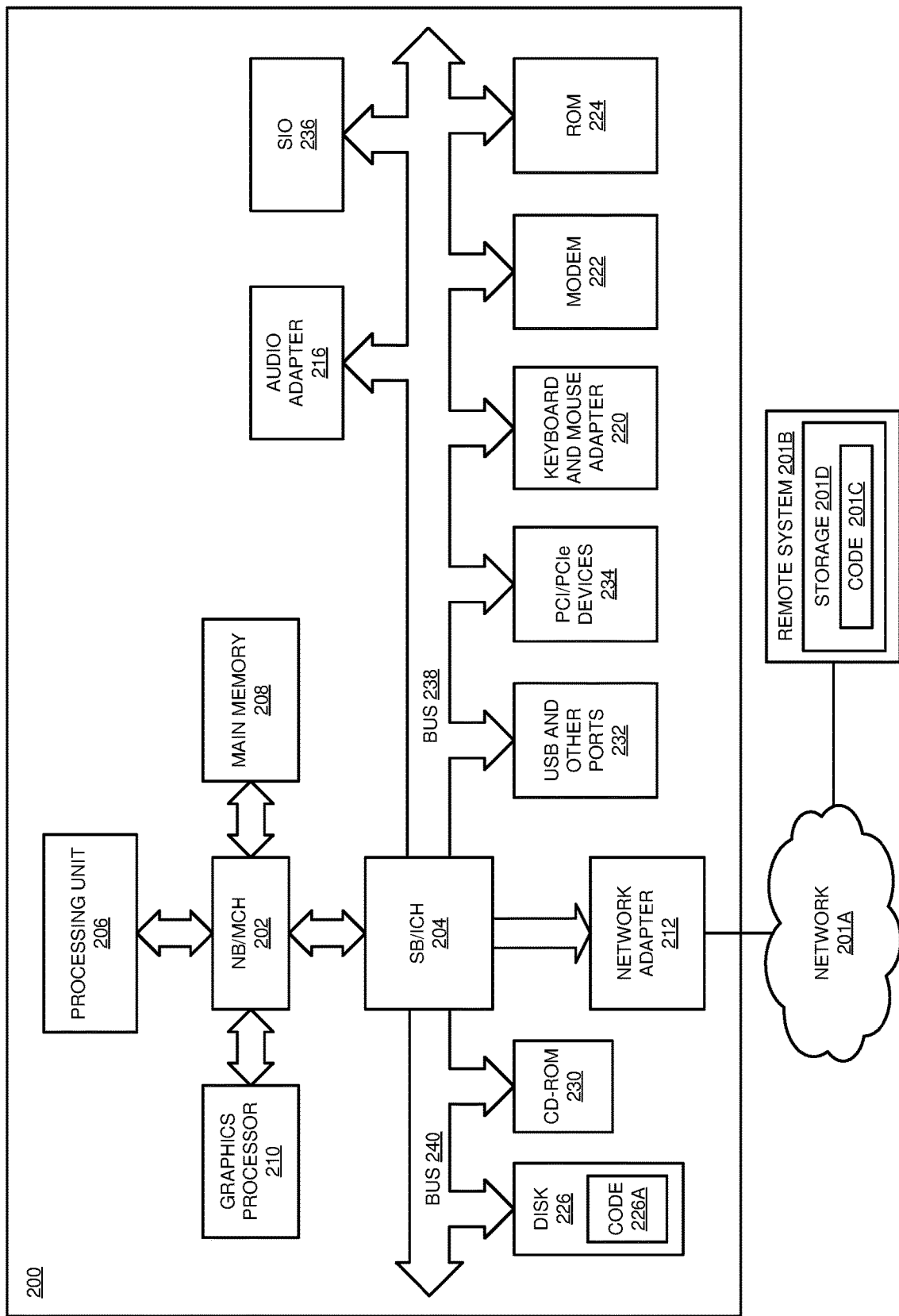
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in a stream processing system, for example a stream processing system hosted on servers 104 or 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
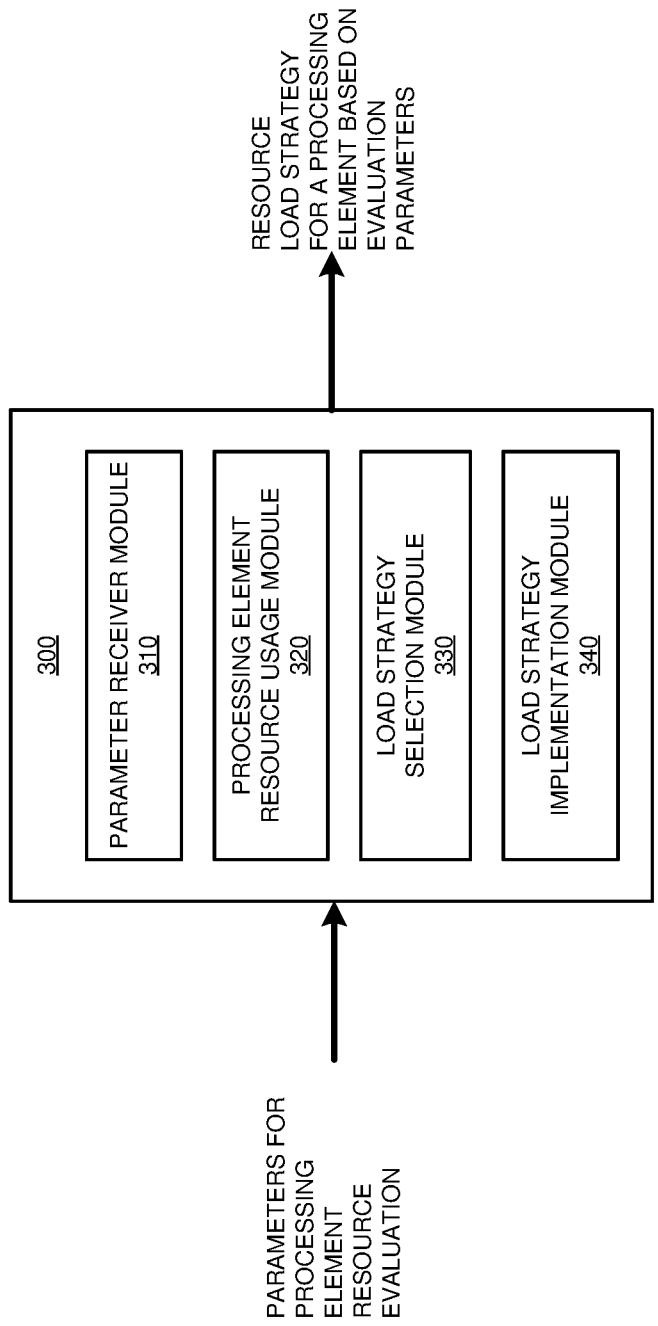
FIG. 3 depicts a block diagram of an example configuration for multiple metric based load prediction and resource allocation in an active stream processing job in accordance with an illustrative embodiment.

With reference to FIG. 3, this figure depicts a block diagram of an example configuration for multiple metric based load prediction and resource allocation in an active stream processing job in accordance with an illustrative embodiment. Application 300 is an example of application 105 in FIG. 1 and executes in server 104 or 106 in FIG. 1.

Parameter receiver module 310 receives a load metric, a threshold corresponding to the load metric, and a specification of a PE to be placed onto a resource with available capacity as determined by the load metric and the threshold. PE resource usage module 320 calculates a load metric for a resource, classifies a calculated load, and evaluates a candidate resource based on the load on the resource. Module 320 also evaluates a throughput improvement predicted to result from migrating the PE to a candidate resource, and categorizes the throughput improvement. Load strategy selection module 330, using the evaluation, selects, from a set of candidate resources within the highest rated category available, a load strategy for the PE. Load strategy implementation module 340 implements the selected load strategy.

Figure 4:
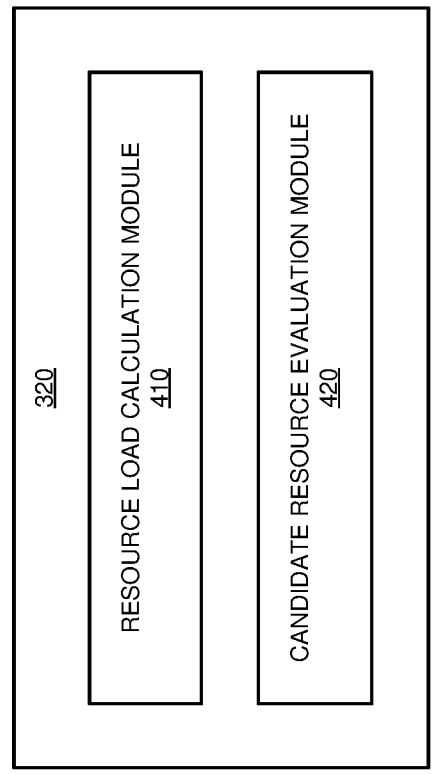
FIG. 4 depicts a block diagram of further detail of an example configuration for multiple metric based load prediction and resource allocation in an active stream processing job in accordance with an illustrative embodiment.

With reference to FIG. 4, this figure depicts a block diagram of further detail of an example configuration for multiple metric based load prediction and resource allocation in an active stream processing job in accordance with an illustrative embodiment. In particular, FIG. 4 depicts more detail of PE resource usage module 320 in FIG. 3.

Resource load calculation module 410 determines a load according to a load metric, as well as a composite load characterizing a set of load metrics. Module 410 determines a current load on a resource on which a PE is currently executing, including measuring current usage according to a particular load metric and classifying current usage against one or more thresholds corresponding to the particular load metric. Thus, for each load metric, usage is classified into overloaded or not (for an application 300 using one threshold), one of overloaded, underloaded, and medium loaded (for an application 300 using two thresholds), or one of a set of finer classifications (for an application 300 using more than two thresholds). Module 410 also calculates a current composite load based on the classification of each load metric as follows: if all load metrics have been classified as underloaded, the composite load is also classified as underloaded. If any load metric has been classified as overloaded, the composite load is also classified as overloaded. Otherwise, the composite load is classified as medium loaded.

Module 410 also determines a predicted composite load on a candidate resource the PE could be migrated to. To determine the predicted composite load, Module 410 measures current usage according to a particular load metric, adds projected PE usage according to the same load metric, and classifies the sum of the usages against one or more thresholds corresponding to the same load metric. For the projected PE usage, nodule 410 is configurable to use a default value used for any yet-to-be-deployed PE, or a default value used for a yet-to-be-deployed PE of the same type as this PE, or a default value used for a similar PE, where similarity is determined by a measure other than a type classification. Module 410 is also configurable to use, for the projected PE usage, a value based on historical information from a prior deployment of this PE, a prior deployment of a PE of the same type as this PE, or a prior deployment a similar PE, where similarity is determined by a measure other than a type classification. Module 410 also calculates a predicted composite load based on the classified sum of the usages of each load metric as described herein.

From the predicted composite load for one or more candidate resources, candidate resource evaluation module 420 evaluates and categorizes a throughput improvement predicted to result from migrating the PE to a candidate resource.

Figure 5:
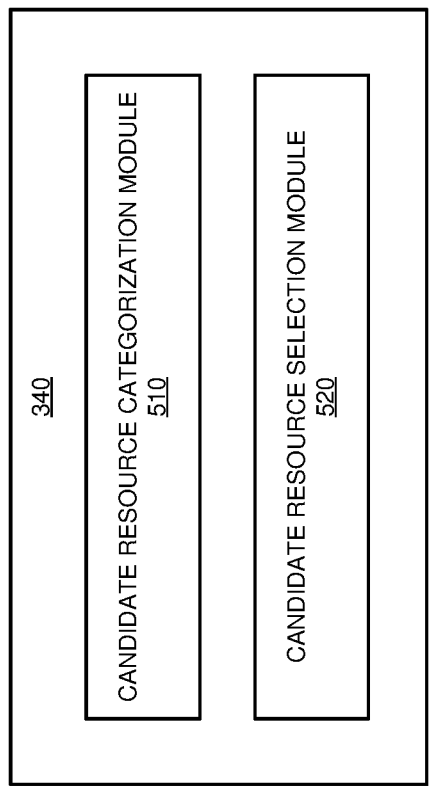
FIG. 5 depicts a block diagram of further detail of an example configuration for multiple metric based load prediction and resource allocation in an active stream processing job in accordance with an illustrative embodiment.

With reference to FIG. 5, this figure depicts a block diagram of further detail of an example configuration for multiple metric based load prediction and resource allocation in an active stream processing job in accordance with an illustrative embodiment. In particular, FIG. 5 depicts more detail of PE resource usage module 340 in FIG. 3.

Candidate resource categorization module 510 categorizes a candidate resource based on the predicted composite load that would be created by migrating the PE to that candidate resource. Then, from a set of candidate resources within the highest rated category available, candidate resource selection module 520 selects, as a final candidate resource, the candidate resource having the most capacity as determined by one particular load metric.

Figure 6:
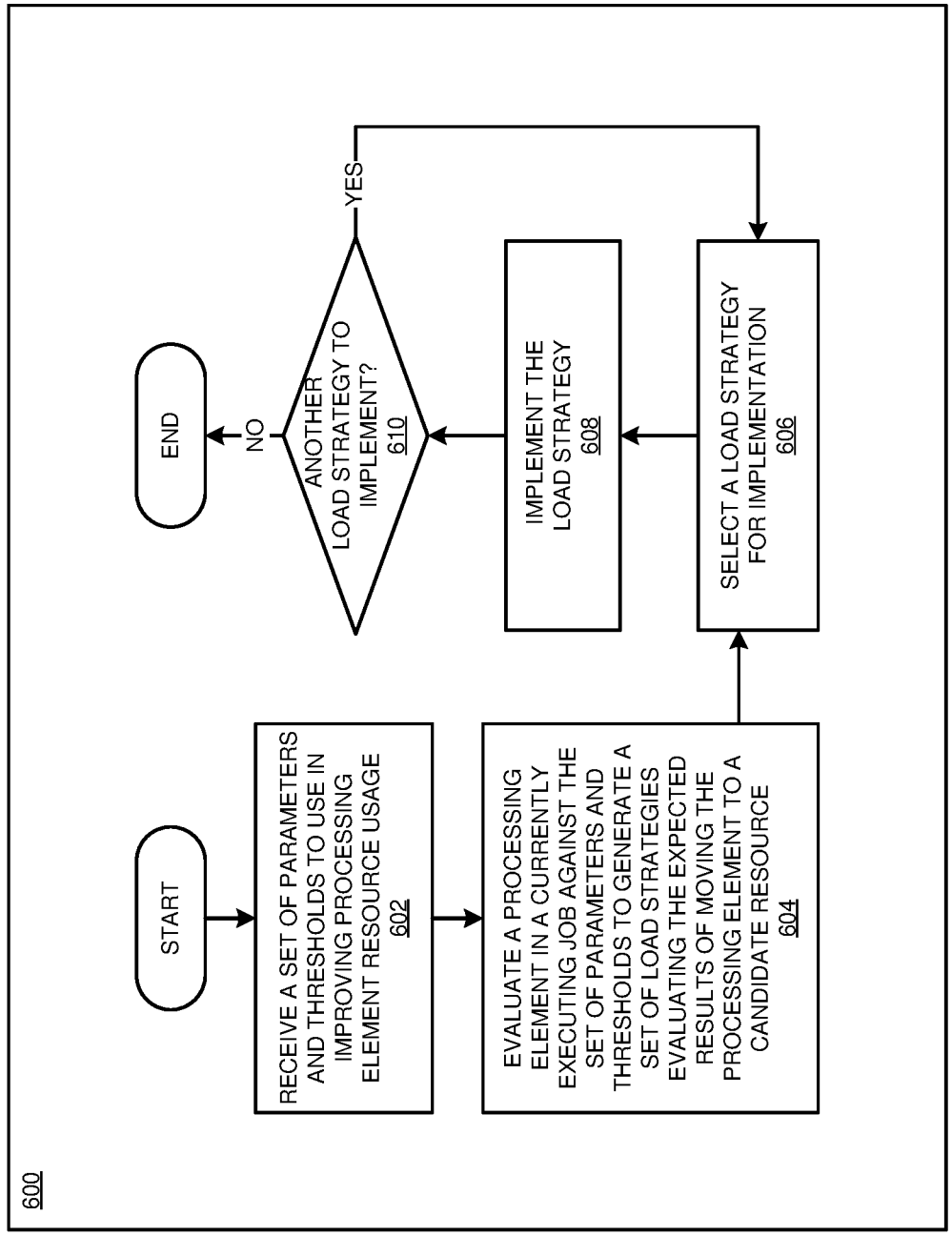
FIG. 6 depicts a flowchart of an example process for multiple metric based load prediction and resource allocation in an active stream processing job in accordance with an illustrative embodiment.

With reference to FIG. 6, this figure depicts a flowchart of an example process for multiple metric based load prediction and resource allocation in an active stream processing job in accordance with an illustrative embodiment. Process 600 can be implemented in application 300 in FIG. 3.

In block 602, the application receives set of parameters including a load metric and a threshold corresponding to the load metric to be used in improving PE resource usage. In block 604, the application evaluates a PE in a currently executing job against the set of parameters and thresholds to generate a set of load strategies evaluating the expected results of moving the PE to a candidate resource. to be placed onto a resource with available capacity as determined by the load metric and the threshold. In block 606, the application selects a load strategy for implementation. In block 608, the application implements the load strategy by migrating a PE to a resource. In block 610, the application checks whether another load strategy is to be implemented. If so ("YES" path of block 610), the application returns to block 606. Otherwise ("NO" path of block 610), the application ends.

Figure 7:
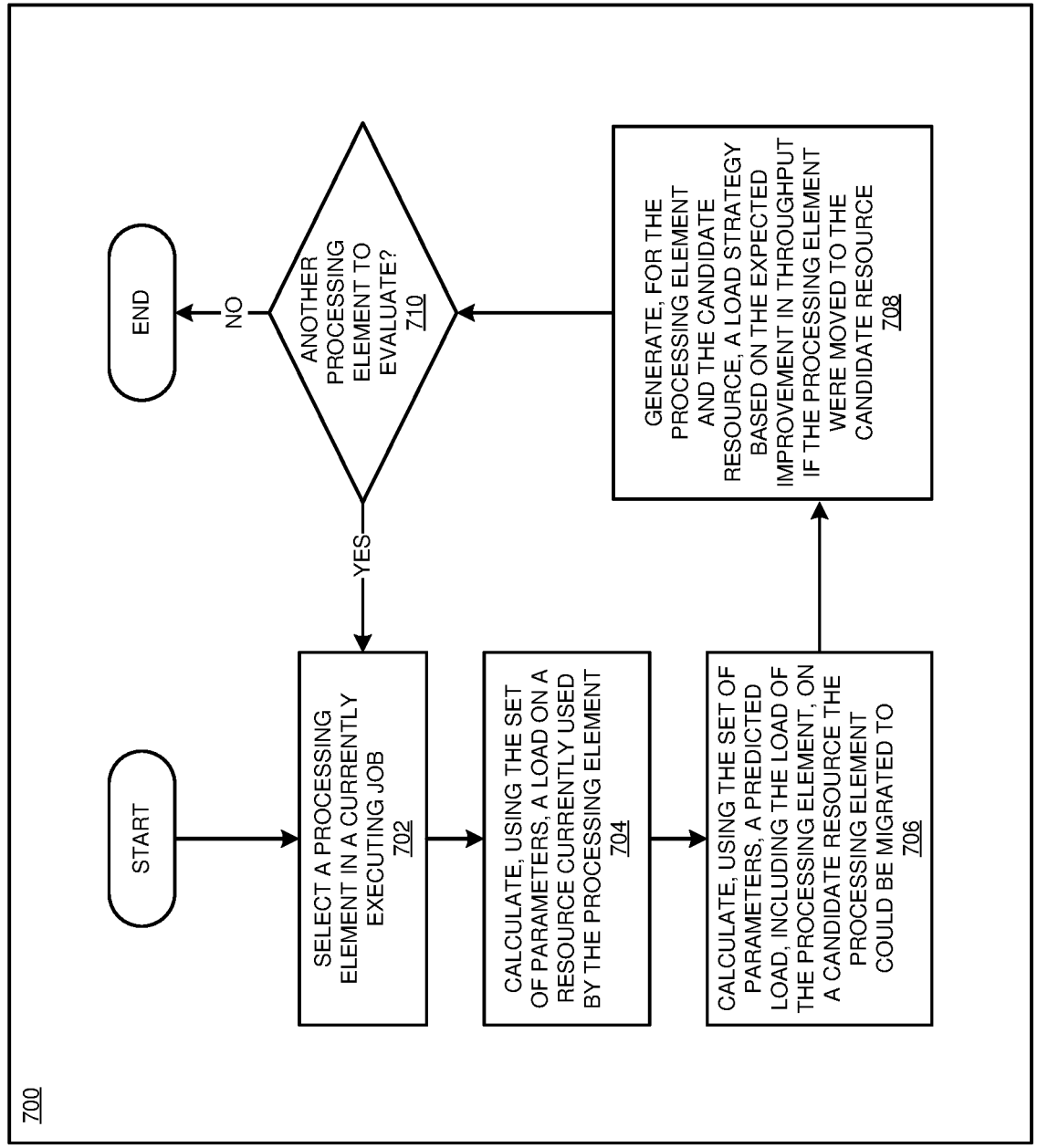
FIG. 7 depicts a flowchart of an example process for multiple metric based load prediction and resource allocation in an active stream processing job in accordance with an illustrative embodiment.

With reference to FIG. 7, this figure depicts a flowchart of an example process for multiple metric based load prediction and resource allocation in an active stream processing job in accordance with an illustrative embodiment. Process 700 gives more detail of block 604 in FIG. 3 and can be implemented in application 300 in FIG. 3.

In block 702, the application selects a PE in a currently executing job. In block 704, the application calculates, using the set of parameters, a load on a resource currently used by the PE. In block 706, the application calculates, using the set of parameters, a predicted load including the load of the PE, on a candidate resource to which the PE could be migrated. In block 708, the application generates, for the PE and candidate resource, a load strategy based on the expected improvement in throughput if the PE were moved to the candidate resource. In block 710, the application checks whether there is another PE to evaluate. If so ("YES" path of block 710), the application returns to block 702. Otherwise, the application ends.

With reference to FIG. 8, this figure depicts a flowchart of an example process for multiple metric based load prediction and resource allocation in an active stream processing job in accordance with an illustrative embodiment. Process 800 gives more detail of block 608 in FIG. 3 and can be implemented in application 300 in FIG. 3.

In block 802, the application categorizes a candidate resource based on a predicted composite load if the PE were to be migrated to that resource. In block 804, from a set of resources in the highest rated category, the application selects a target resource—a resource to which the PE is to be migrated—based on a predicted load metric for the candidate resource if the PE were to be migrated to that resource. Then the application ends.

Thus, a computer implemented method, system or apparatus, and computer program product are provided in the illustrative embodiments for multiple metric based load prediction and resource allocation in an active stream processing job and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
modifying a portion of a currently executing compiled streams application according to a request to modify a configuration of the portion, wherein the portion is executing on an executing processing element, wherein the request specifies a set of load metrics and a threshold corresponding to each load metric in the set of load metrics, wherein the modifying comprises:
measuring, according to each load metric, a corresponding load usage percentage of a current composite load on a resource used by the executing processing element;
classifying, according to each threshold, each load usage percentage of the current composite load on the resource to one of an overloaded state and an acceptably loaded state;
classifying, responsive to any load usage percentage of the current composite load on the resource being classified to the overloaded state, the current composite load to the overloaded state;
predicting, according to each load metric, a corresponding load usage percentage of a first candidate resource selected from a set of candidate resources, each predicted load usage percentage predicted using a sum of the current composite load and a projected load on the first candidate resource by the executing processing element;

classifying, according to each threshold, each predicted load usage percentage to one of an overloaded state and an acceptably loaded state;

classifying, responsive to any predicted load usage percentage of the predicted load on the first candidate resource being classified to the overloaded state, a predicted composite load to the overloaded state;

generating a configuration modification based on a predicted throughput improvement resulting from migrating the processing element to the first candidate resource, the predicted throughput improvement comprising a change in classification of the predicted composite load from the overloaded state to a state other than the overloaded state; and migrating the processing element to the first candidate resource, migration of the processing element to the first candidate resource resulting in a throughput improvement.

2. The method of claim 1, wherein the request specifies the processing element.

3. The method of claim 1, wherein the request further specifies a lower threshold corresponding to each load metric in the set of load metrics.

4. The method of claim 3, further comprising reclassifying, according to each threshold and each lower threshold, each load usage percentage of the current composite load on the resource to one of the overloaded state, the acceptably loaded state, and an underloaded state;

reclassifying, responsive to all load usage percentages of the current composite load on the resource being classified to the underloaded state, the composite load to the underloaded state.

5. The method of claim 4, further comprising:

reclassifying, responsive to at least one load usage percentage of the current composite load on the resource being classified to the acceptably loaded state and no load usage percentage being classified to the overloaded state, the composite load to the acceptably loaded state.

6. The method of claim 3, further comprising:

reclassifying, according to each threshold and each lower threshold, each predicted load usage percentage to one of the overloaded state, the acceptably loaded state, and an underloaded state; and reclassifying, responsive to all predicted load usage percentages of the predicted load on the first candidate resource being classified to the underloaded state, the predicted composite load to the underloaded state.

7. The method of claim 6, further comprising:

reclassifying, responsive to at least one predicted load usage percentage of the predicted load on the first candidate resource being classified to the acceptably loaded state and no predicted load usage percentage being classified to the overloaded state, the predicted composite load to the acceptably loaded state.

8. The method of claim 1, further comprising:

classifying, responsive to all load usage percentages of the current composite load on the resource being classified to the acceptably loaded state, the current composite load to the acceptably loaded state.

9. The method of claim 1, further comprising:

classifying, responsive to all predicted load usage percentages of the predicted load on the first candidate resource being classified to the acceptably loaded state, the predicted composite load to the acceptably loaded state.

10. A computer usable program product comprising one or more computer-readable storage mediums, and program instructions stored on at least one of the one or more storage mediums, the stored program instructions comprising:

program instructions to modify a portion of a currently executing compiled streams application according to a request to modify a configuration of the portion, wherein the portion is executing on an executing processing element, wherein the request specifies a set of load metrics and a threshold corresponding to each load metric in the set of load metrics, wherein the program instructions to modify comprises:

program instructions to measure, according to each load metric, a corresponding load usage percentage of a current composite load on a resource used by the executing processing element;

program instructions to classify, according to each threshold, each load usage percentage of the current composite load on the resource to one of an overloaded state and an acceptably loaded state;

program instructions to classify, responsive to any load usage percentage of the current composite load on the resource being classified to the overloaded state, the current composite load to the overloaded state;

program instructions to predict, according to each load metric, a corresponding load usage percentage of a first candidate resource selected from a set of candidate resources, each predicted load usage percentage predicted using a sum of the current composite load and a projected load on the first candidate resource by the executing processing element;

program instructions to classify, according to each threshold, each predicted load usage percentage to one of an overloaded state and an acceptably loaded state;

program instructions to classify, responsive to any predicted load usage percentage of the predicted load on the first candidate resource being classified to the overloaded state, a predicted composite load to the overloaded state;

program instructions to generate a configuration modification based on a predicted throughput improvement resulting from migrating the processing element to the first candidate resource, the predicted throughput improvement comprising a change in classification of the predicted composite load from the overloaded state to a state other than the overloaded state; and program instructions to migrate the processing element to the first candidate resource, migration of the processing element to the first candidate resource resulting in a throughput improvement.

11. The computer usable program product of claim 10, wherein the request specifies the processing element.

12. The computer usable program product of claim 10, wherein the request further specifies a lower threshold corresponding to each load metric in the set of load metrics.

13. The computer usable program product of claim 12, further comprising program instructions to reclassify classify, according to each threshold and each lower threshold, each load usage percentage of the current composite load on the resource to one of the overloaded state, the acceptably loaded state, and an underloaded state;

program instructions to reclassify, responsive to all load usage percentages of the current composite load on the resource being classified to the underloaded state, the composite load to the underloaded state.

14. The computer usable program product of claim 13, further comprising:
program instructions to reclassify, responsive to at least one load usage percentage of the current composite load on the resource being classified to the acceptably loaded state and no load usage percentage being classified to the overloaded state, the composite load to the acceptably loaded state.

15. The computer usable program product of claim 12, further comprising:
program instructions to reclassify, according to each threshold and each lower threshold, each predicted load usage percentage to one of the overloaded state, the acceptably loaded state, and an underloaded state; and
program instructions to reclassify, responsive to all predicted load usage percentages of the predicted load on the first candidate resource being classified to the underloaded state, the predicted composite load to the underloaded state.

16. The computer usable program product of claim 10, wherein the computer usable program product is stored in a computer readable storage device in a data processing system, and wherein the computer usable program product is transferred over a network from a remote data processing system.

17. The computer usable program product of claim 10, wherein the computer usable program product is stored in a computer readable storage device in a server data processing system, and wherein the computer usable program product is downloaded over a network to a remote data processing system for use in a computer readable storage device associated with the remote data processing system.

18. The computer usable program product of claim 10, further comprising:
program instructions to classify, responsive to all load usage percentages of the current composite load on the resource being classified to the acceptably loaded state, the current composite load to the acceptably loaded state.

19. The computer usable program product of claim 10, further comprising:
program instructions to classify, responsive to all predicted load usage percentages of the predicted load on the first candidate resource being classified to the acceptably loaded state, the predicted composite load to the acceptably loaded state.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to modify a portion of a currently executing compiled streams application according to a request to modify a configuration of the portion, wherein the portion is executing on an executing processing element, wherein the request specifies a set of load metrics and a threshold corresponding to each load metric in the set of load metrics, wherein the program instructions to modify comprises:
program instructions to measure, according to each load metric, a corresponding load usage percentage of a current composite load on a resource used by the executing processing element;
program instructions to classify, according to each threshold, each load usage percentage of the current composite load on the resource to one of an overloaded state and an acceptably loaded state;
program instructions to classify, responsive to any load usage percentage of the current composite load on the resource being classified to the overloaded state, the current composite load to the overloaded state;
program instructions to predict, according to each load metric, a corresponding load usage percentage of a first candidate resource selected from a set of candidate resources, each predicted load usage percentage predicted using a sum of the current composite load and a projected load on the first candidate resource by the executing processing element;
program instructions to classify, according to each threshold, each predicted load usage percentage to one of an overloaded state and an acceptably loaded state;
program instructions to classify, responsive to any predicted load usage percentage of the predicted load on the first candidate resource being classified to the overloaded state, a predicted composite load to the overloaded state;
program instructions to generate a configuration modification based on a predicted throughput improvement resulting from migrating the processing element to the first candidate resource, the predicted throughput improvement comprising a change in classification of the predicted composite load from the overloaded state to a state other than the overloaded state; and
program instructions to migrate the processing element to the first candidate resource, migration of the processing element to the first candidate resource resulting in a throughput improvement.

21. The computer system of claim 20, wherein the request specifies the processing element.

* * * * *